US007309152B2

United States Patent
Huang

(10) Patent No.: US 7,309,152 B2
(45) Date of Patent: Dec. 18, 2007

(54) LIGHT SOURCE STRUCTURE OF BACKLIGHT MODULE

(75) Inventor: Tai-Ho Huang, San Chung (TW)

(73) Assignee: Unity Opto Technology Co., Ltd., Taipei Hsien (TW)

( * ) Notice: Subject to any disclaimer, the term of this patent is extended or adjusted under 35 U.S.C. 154(b) by 22 days.

(21) Appl. No.: 11/284,824

(22) Filed: Nov. 23, 2005

(65) Prior Publication Data

US 2007/0115648 A1    May 24, 2007

(51) Int. Cl.
*F21V 7/04* (2006.01)
*H01L 33/00* (2006.01)

(52) U.S. Cl. .................... 362/612; 362/555
(58) Field of Classification Search ............... 362/27, 362/612, 555, 228, 234, 252
See application file for complete search history.

(56) References Cited

U.S. PATENT DOCUMENTS

| | | | | |
|---|---|---|---|---|
| 6,431,728 | B1* | 8/2002 | Fredericks et al. | 362/249 |
| 6,608,614 | B1* | 8/2003 | Johnson | 345/102 |
| 6,882,111 | B2* | 4/2005 | Kan et al. | 315/122 |
| 2003/0012035 | A1* | 1/2003 | Bernard | 362/555 |
| 2003/0156416 | A1* | 8/2003 | Stopa et al. | 362/294 |
| 2004/0206964 | A1* | 10/2004 | Matsumura et al. | 257/79 |
| 2004/0218388 | A1* | 11/2004 | Suzuki | 362/231 |
| 2005/0276053 | A1* | 12/2005 | Nortrup et al. | 362/294 |
| 2006/0104090 | A1* | 5/2006 | Lengyel et al. | 362/612 |
| 2006/0221637 | A1* | 10/2006 | Chikugawa et al. | 362/612 |

* cited by examiner

*Primary Examiner*—Jong-Suk(James) Lee
*Assistant Examiner*—David R. Crowe
(74) *Attorney, Agent, or Firm*—Troxell Law Office, PLLC

(57) ABSTRACT

A light source structure of a backlight module comprises: a bar-shaped light source; and a group of complementary color light emitting diodes mounted at both ends of the bar-shaped light source. The bar-shaped light source is composed of several light emitting diodes having complementary light colors. The luminous intensity of outermost light emitting diodes of the bar-shaped light source is 30 to 70% of average luminous intensity of the other equal color light emitting diodes. The complementary color light emitting diodes have light colors complementary to that of the outermost light emitting diodes of the bar-shaped light source. The luminous intensity of the complementary color light emitting diodes is 10 to 50% of average luminous intensity of the other equal color light emitting diodes of the bar-shaped light source. Consequently, the non-uniform mixing of lights on edges of the backlight module and the producing of bright point can be avoided.

1 Claim, 3 Drawing Sheets

LIGHT SOURCE STRUCTURE OF BACKLIGHT MODULE

FIELD OF THE INVENTION

The present invention relates a light source structure of a backlight module that avoids single-color bright point on edges, and more particular to a light source structure that is applicable to flat panel monitors, liquid crystal monitors, or the likes.

BACKGROUND OF THE INVENTION

Backlight modules are widely applied to flat panel monitors. The backlight modules are key components of liquid crystal display (LCD) panels. The backlight modules are designed for providing light sources with sufficient brightness and uniform distribution since the liquid crystals are not luminaries.

Generally speaking, the backlight modules are classified into direct-type backlight modules and side-edge backlight modules. The direct-type backlight module requires larger mounting space since a lamp is mounted under the module directly. In addition, two or more lamps can be applied to the direct-type backlight module for providing good uniformity and high brightness. However, the thickness and the weight of the direct-type backlight module are increased correspondingly. Furthermore, the utilization of more lamps consumes more power. Accordingly, the direct-type backlight module is more suitable to monitors or TVs, which require comparatively less portability and have enough mounting space.

In the side-edge backlight module, a unilateral or L-shaped light source is usually used. As shown in FIG. 3, the side-edge backlight module is composed of a base box A, a light guide plate B, a L-shaped light source C, and a control circuit D. The L-shaped light source C is composed of an array of red, blue, and green light emitting diodes (LEDs). The L-shaped light source C is mounted on the edge of the light guide plate B, and the L-shaped light source C and the light guide plate B are mounted in the base box A together, wherein the L-shaped light source C is further connected the control circuit D such that the L-shaped light source C can utilize the light guide plate B for controlling the progress direction of the light. However, a major drawback of the side-edge backlight module consists in that since the L-shaped light source C is located adjacent to the edges of the base box A, bright points, individual colors, and non-uniform mixing of lights on the edges are caused by the physical phenomenon of total reflection on the box's edges after the side-edge backlight module is electrified.

In view of the aforementioned conventional drawbacks, the present inventor makes diligent studies in providing consumers with a light source structure of a backlight module that avoids the non-uniform mixing of lights on edges according to the motive of the present invention.

SUMMARY OF THE INVENTION

It is a main objective of the present invention to provide a light source structure of a backlight module that avoids the single-color bright point on edges and the non-uniform mixing of lights on the edges.

In order to achieve this objective, a light source structure of a backlight module is disclosed. The light source structure of the backlight module comprises: a bar-shaped light source; and a group of complementary color light emitting diodes mounted at both ends of the bar-shaped light source. The bar-shaped light source is composed of a plurality of light emitting diodes having complementary light colors. The luminous intensity of outermost light emitting diodes of the bar-shaped light source is 30 to 70% of average luminous intensity of other equal color light emitting diodes. The complementary color light emitting diodes have light colors complementary to that of the outermost light emitting diodes of the bar-shaped light source. The luminous intensity of the complementary color light emitting diodes is 10 to 50% of average luminous intensity of the other equal color light emitting diodes of the bar-shaped light source. Consequently, the non-uniform mixing of lights on the edges of the backlight module can be avoided.

The aforementioned objectives and advantages of the present invention will be readily clarified in the description of the preferred embodiments and the enclosed drawings of the present invention.

DETAILED DESCRIPTION OF THE PREFERRED EMBODIMENT

Figure 1:
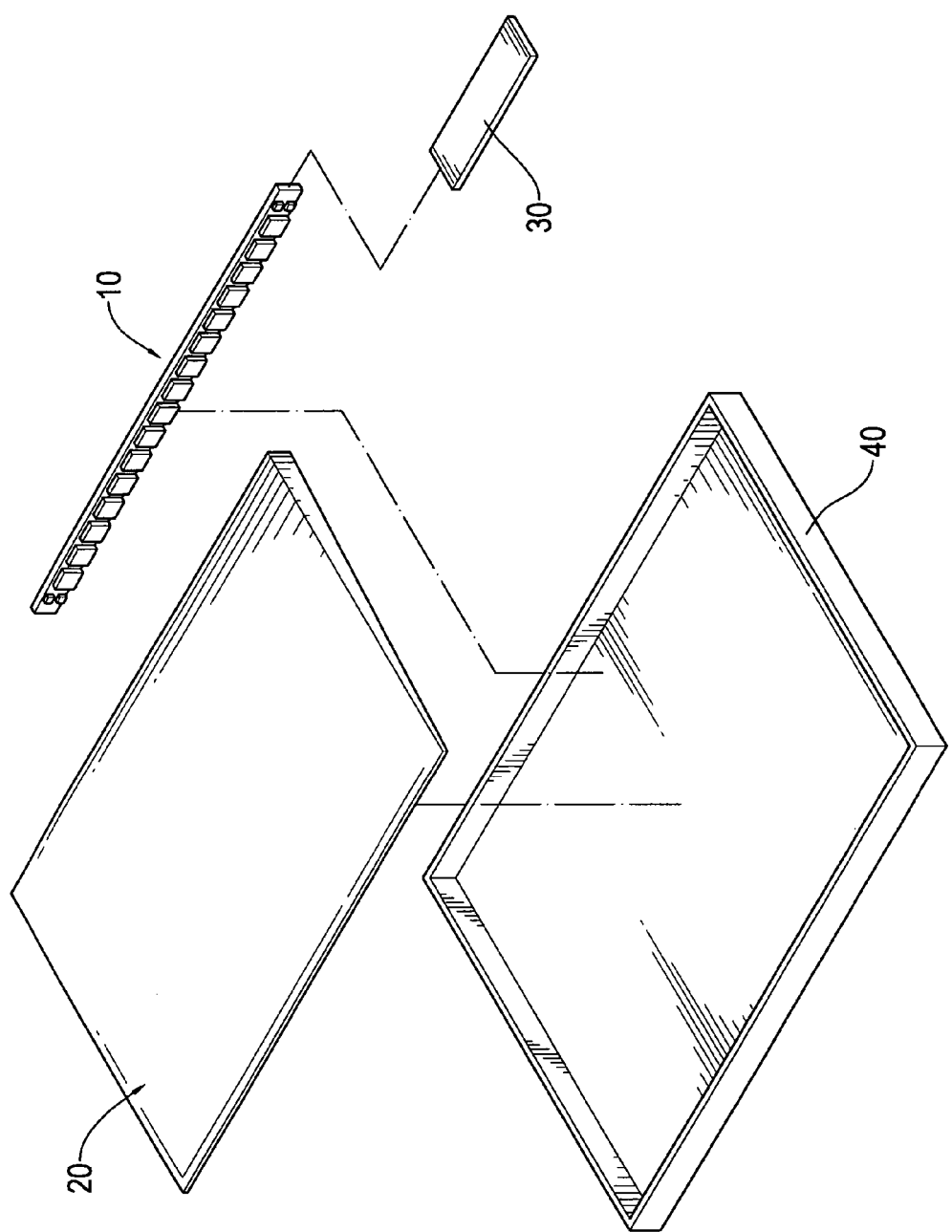
FIG. 1 is a decomposed view showing a preferred embodiment of the present invention.
Figure 2:
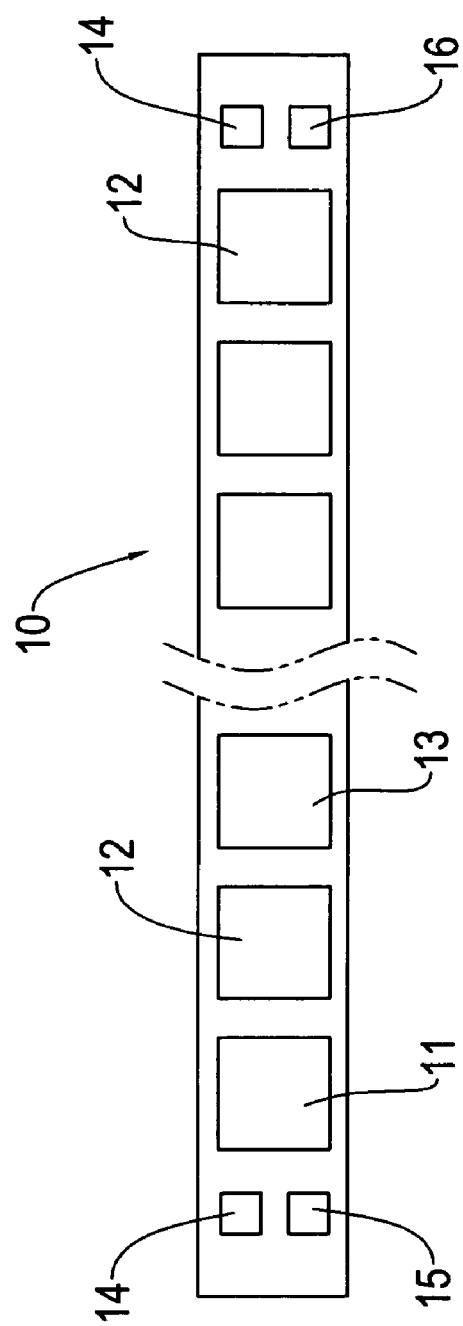
FIG. 2 is a top view showing a light source structure of the present invention.
Figure 3:
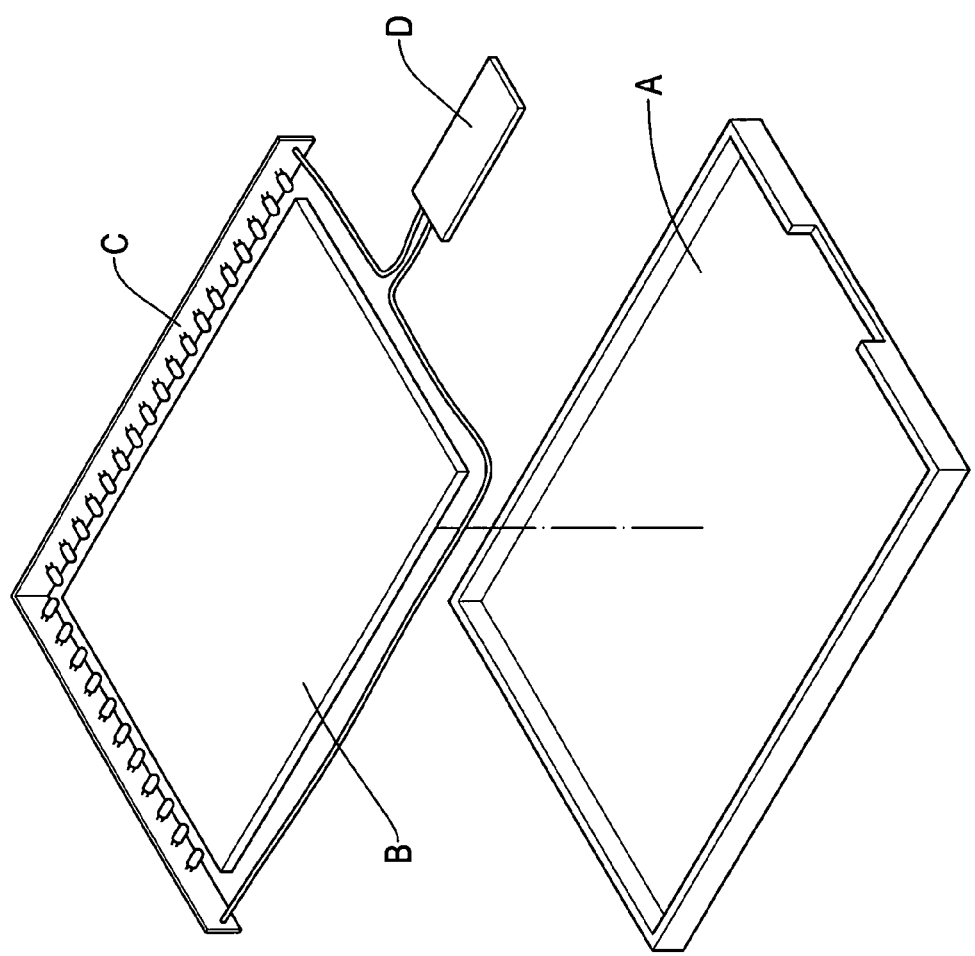
FIG. 3 is a decomposed view showing a conventional side-edge backlight module.

Referring to FIG. 1, a backlight module 1 of the present invention comprises a box 40, wherein a light guide plate 20 is mounted in the box 40. A bar-shaped light source 10 is mounted on one side of the light guide plate 20, and the bar-shaped light source 10 is connected to a control circuit 30. In addition, the bar-shaped light source 10 is composed of a plurality light emitting diodes, which have complementary light colors. An exemplification will now be given with reference to FIG. 2, where green, blue, and red LEDs 11, 12, and 13 are utilized in this preferred embodiment. The bar-shaped light source 10 is composed of a plurality of green, blue, and red LEDs 11, 12, and 13, which are spaced at equal intervals, wherein the luminous intensity of the outermost LEDs mounted respectively at both ends of the bar-shaped light source 10 is 30 to 70% of average luminous intensity of other equal color LEDs. In addition, depending on the color of the light emitted from each of the outermost LEDs, two light sources with light colors complementary to that of the outermost LED are mounted on upper and lower proper portions beside this outermost LED, wherein the luminous intensity of these light sources is 10 to 50% of average luminous intensity of the other equal color LEDs. For example, if the outermost LED is a green LED 11, then a red LED 14 and a blue LED 15 with 10 to 50% of average luminous intensity of the other equal color LEDs are mounted on upper and lower proper portions beside this green LED 11. If the outermost LED is a blue LED 12, then a red LED 14 and a green LED 16 with 10 to 50% of average luminous intensity of the other equal color LEDs are mounted on upper and lower proper portions beside this blue LED 12.

When the power source of the control circuit 30 is switched on, three colored lights are emitted from the green, blue, and red LEDs 11, 12, and 13 of the bar-shaped light source 10 simultaneously so as to obtain the white light by mixing these three colored lights. The luminous intensity at both ends of the bar-shaped light source 10 is decreased gradually since the green and blue LEDs 11, 12 have 30 to 70% of average luminous intensity of other equal color LEDs. Besides, the light sources (red LED 14/blue LED 15 and red LED 14/green LED 16) with light colors complementary to that of the outermost LEDs, respectively, are mounted on upper and lower proper portions beside these outermost LEDs, wherein the luminous intensity of these light sources is 10 to 50% of average luminous intensity of the other equal color LEDs, whereby mirrorlike edges of the box 40 are prevented from the occurrence of total reflection phenomenon, which causes defects including non-uniform mixing of lights. Moreover, the addition of the light sources (red LED 14/blue LED 15 and red LED 14/green LED 16) with reduced luminous intensity, which is 10 to 50% of average luminous intensity of the other equal color LEDs, prevents the green and blue LEDs 11, 12 mounted at both ends of the bar-shaped light source 10 from the inconvenience of needing to mount an additional circuit for decreasing brightness gradually.

In summary, the light source structure of the backlight module of the present invention avoids the producing of the individual colors at both ends, which occur in the conventional side-edge backlight module. Accordingly, the present invention satisfies patentability and is submitted for a patent.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments, which do not depart from the spirit and scope of the invention.

What the invention claimed is:

1. A light source structure of a backlight module comprising:
   a bar-shaped light source, the bar-shaped light source being composed of a plurality of light emitting diodes having light colors complementary to one another, the plurality of light emitting diodes comprising:
      a plurality of inner light emitting diodes of the bar-shaped light source in sequential order, wherein the plurality of inner light emitting diodes comprise at least five light emitting diodes including at least one red light emitting diode, at least one blue light emitting diode, and at least one green light emitting diode, the inner light emitting diodes being sequentially ordered to emit a white light from the module; and
   a group of complementary color light emitting diodes mounted at both ends of the bar-shaped light source, the complementary color light emitting diodes having light colors both different from and complementary to that of an adjacent, outermost light emitting diode of the inner light emitting diodes of the bar-shaped light source,
   wherein the luminous intensity of each of the outermost light emitting diodes of the bar-shaped light source is 30 to 70% of average luminous intensity of at least one inner light emitting diode of equal color, and the luminous intensity of each of the complementary color light emitting diodes is 10 to 50% of average luminous intensity of at least inner light emitting diode of equal color, whereby the non-uniform mixing of lights and the producing of bright point are substantially prevented.

* * * * *